United States Patent [19]

Lampe

[11] 4,322,880
[45] Apr. 6, 1982

[54] METHOD OF FABRICATING A PRESTRESSED CAST IRON VESSEL

[75] Inventor: Robert F. Lampe, Bethel Park, Pa.

[73] Assignee: The United States of America as represented by the United States Department of Energy, Washington, D.C.

[21] Appl. No.: 138,804

[22] Filed: Apr. 9, 1980

[51] Int. Cl.³ .............................................. B21D 39/00
[52] U.S. Cl. ........................................ 29/452; 220/3; 228/184
[58] Field of Search ...................... 29/446, 452; 220/3, 220/5 A; 228/184

[56] References Cited

U.S. PATENT DOCUMENTS

| | | | |
|---|---|---|---|
| 3,329,297 | 7/1967 | Jordan | 220/3 X |
| 3,433,382 | 3/1969 | Boggio | 29/446 X |
| 3,653,434 | 4/1972 | Andersson | 220/3 X |
| 3,734,827 | 5/1973 | Schilling | 29/446 X |
| 4,040,284 | 8/1977 | Fuchs, Jr. | 29/446 X |
| 4,111,327 | 9/1978 | Janakiev | 220/3 |
| 4,125,202 | 11/1978 | Schilling | 220/3 |

*Primary Examiner*—Charlie T. Moon

*Attorney, Agent, or Firm*—Paul A. Gottlieb; Richard G. Besha; James E. Denny

[57] ABSTRACT

A method of fabricating a prestressed cast iron vessel wherein double wall cast iron body segments each have an arcuate inner wall and a spaced apart substantially parallel outer wall with a plurality of radially extending webs interconnecting the inner wall and the outer wall, the bottom surface and the two exposed radial side surfaces of each body segment are machined and eight body segments are formed into a ring. The top surfaces and outer surfaces of the outer walls are machined and keyways are provided across the juncture of adjacent end walls of the body segments. A liner segment complementary in shape to a selected inner wall of one of the body segments is mounted to each of the body segments and again formed into a ring. The liner segments of each ring are welded to form unitary liner rings and thereafter the cast iron body segments are prestressed to complete the ring assembly. Ring assemblies are stacked to form the vessel and adjacent unitary liner rings are welded. A top head covers the top ring assembly to close the vessel and axially extending tendons retain the top and bottom heads in place under pressure.

20 Claims, 10 Drawing Figures

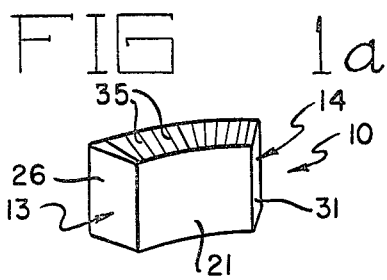
FIG 1a
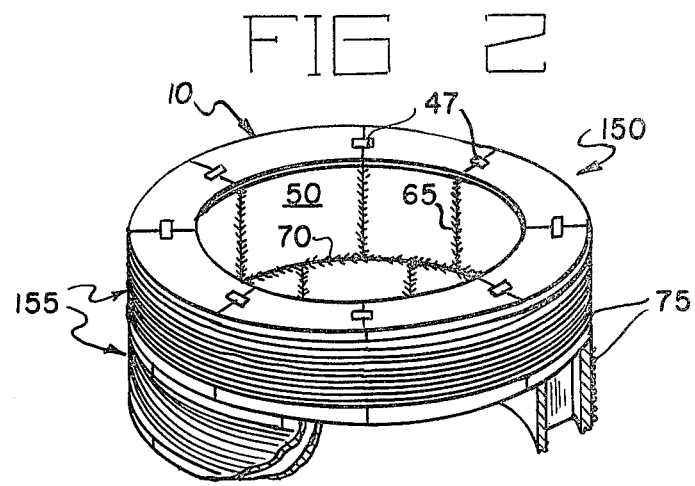
FIG 2
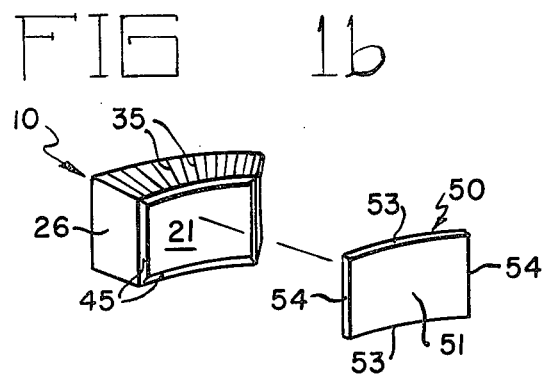
FIG 1b
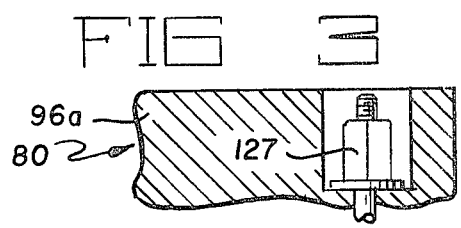
FIG 3
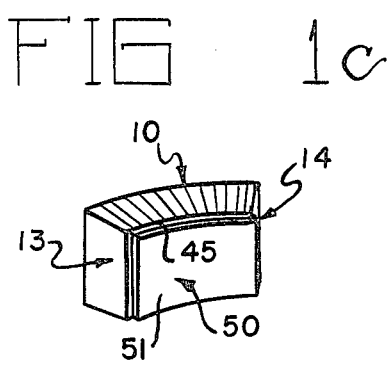
FIG 1c
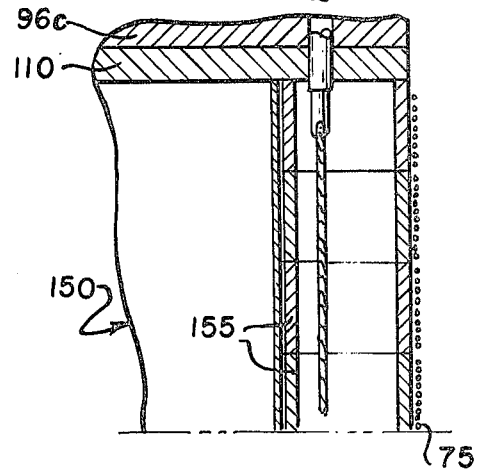
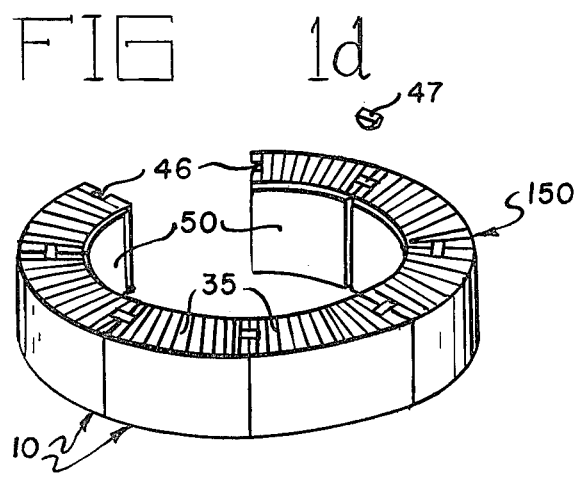
FIG 1d
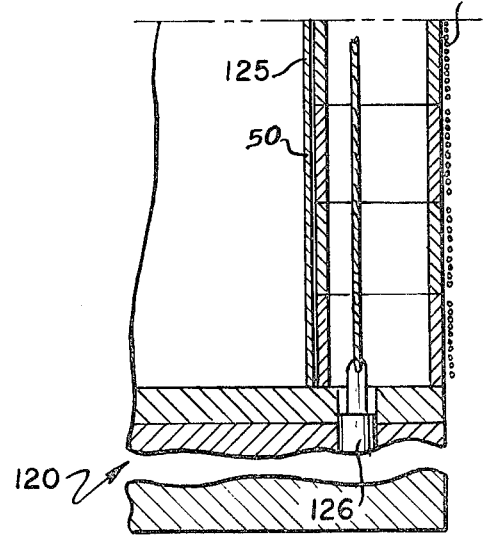

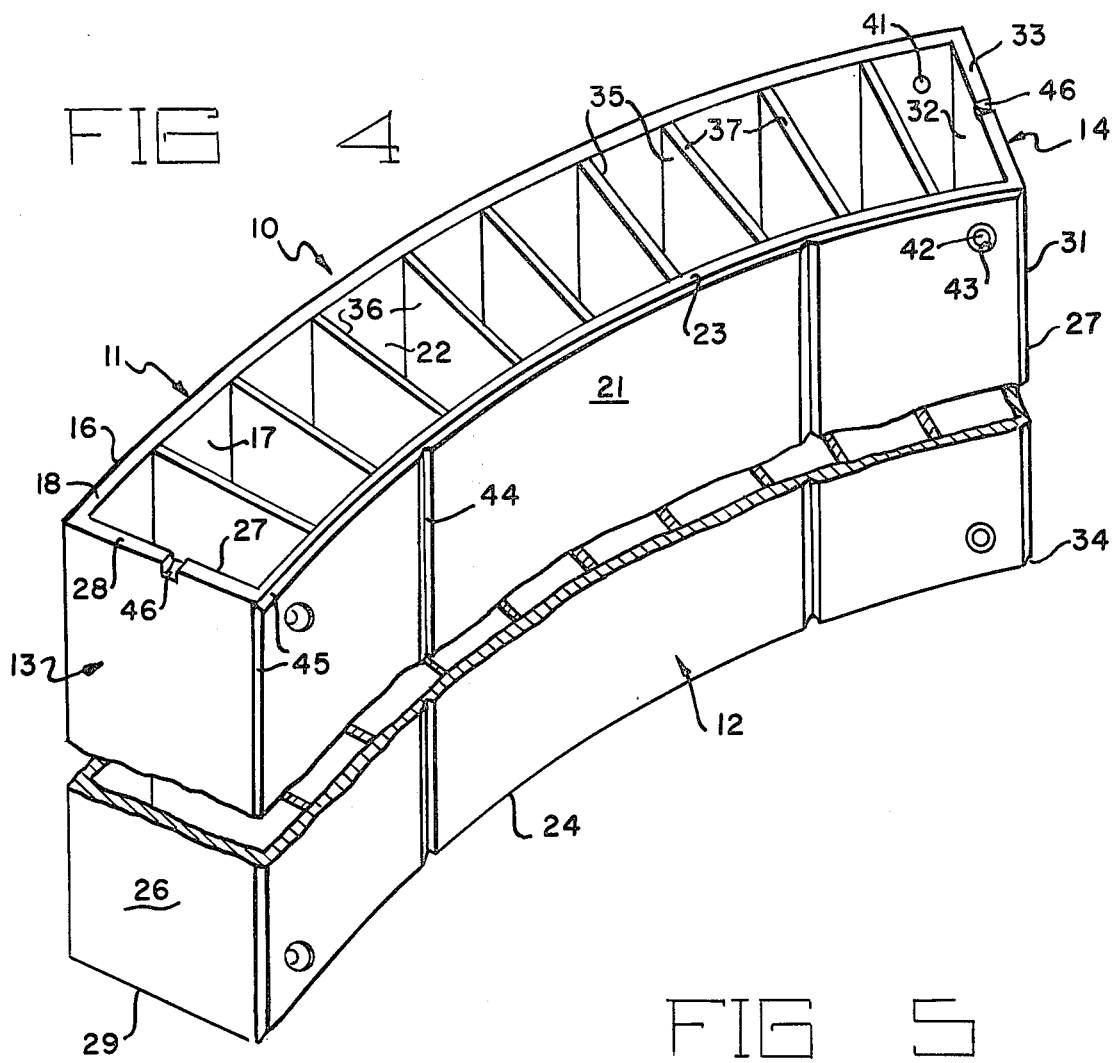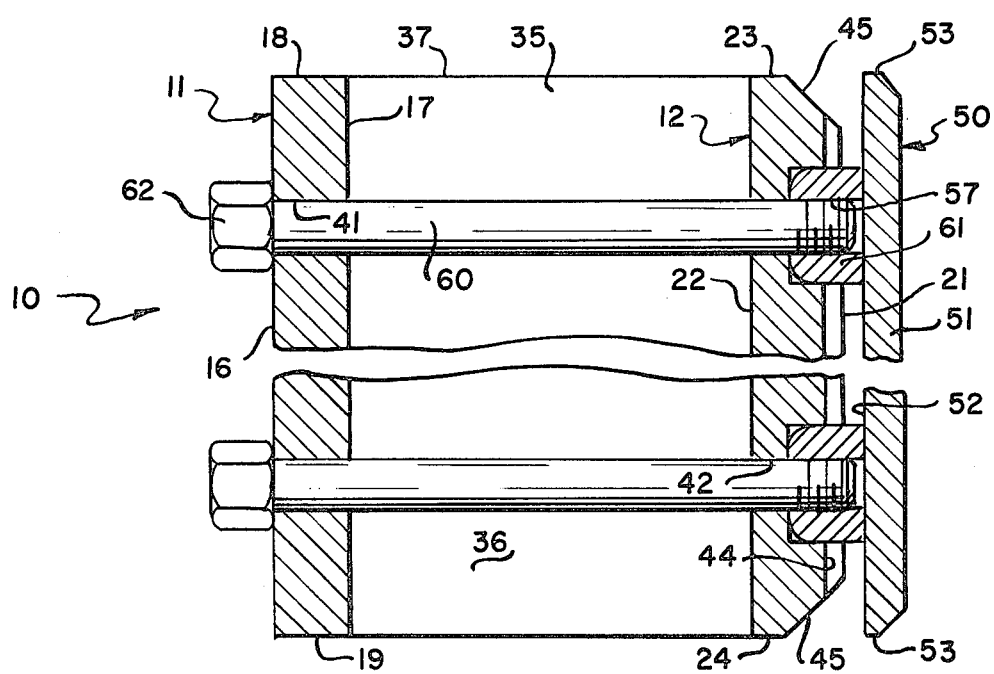

METHOD OF FABRICATING A PRESTRESSED CAST IRON VESSEL

CONTRACTUAL ORIGIN OF THE INVENTION

The invention described herein was made in the course, of, or under, a contract with the U.S. DEPARTMENT OF ENERGY.

BACKGROUND OF THE INVENTION

The present invention relates to method of fabricating a prestressed cast iron vessel. It particularly concerns a method of fabricating a vessel of large volume capable of withstanding large internal pressures.

Industrial vessels have been built for years by forming metal sections and welding them together in the desired shape to form steel vessels. The welding becomes increasingly time consuming and expensive; however, when larger sized vessels are designed requiring the steel wall thickness to exceed about six inches. For this reason, prestressed concrete vessels have been used in recent years to overcome the problems associated with constructing large steel vessels having substantial wall thickness. Even more recently, cast iron has been determined to be a valuable material with attractive properties that can be used in much the same way as concrete to construct large prestressed cast vessels.

The impetus for consideration of cast iron as a structural material is the superior compressive strength and temperature capability of cast iron as compared to concrete, both of which appear to offer the potential for improvements in both safety and economics associated with large vessels. Conceptual design studies of prestressed cast iron vessels have shown that using machined cast iron blocks in lieu of concrete is feasible and that capital cost and construction time can be reduced.

The problem in constructing prestressed cast iron vessels is fundamentally a fit-up problem. The cast iron body of the vessel must be made from numerous segments that are machined individually and stacked appropriately to form the vessel body. To prevent leakage through the wall of such a structure, a ductile metal liner must be used inside the vessel body. The principal problem with such an arrangement is building the liner and the cast iron segments with sufficient dimensional control that good contact results when the body segments are grouped around a liner and prestressed. If too much clearace is permitted between the liner and prestressed cast iron vessel body, the liner may tear during hydrotesting. If too much interference is present, the liner may buckle during prestressing. The key is to find a practical method of fabricating a prestressed cast iron vessel that will produce acceptable contact conditions between the cast iron body and the internal liner.

Previously, fabrication methods for constructing a prestressed cast iron vessel involved construction of the liner as a shell followed by stacking the cast iron body segments around the shell, followed by wrapping the cast iron body segments with the circumferential prestressed members and finally filling the void space between the liner and cast iron body segments with a strong filler material such as grout. The foregoing outlined method presents several major problem areas such as, the circumferential prestressing which is required at various elevations on the vessel is difficult because it is slow and dangerous, particularly where tall vessels are involved. Additionally, filler material such as grout placed into the crevices between the liner and cast iron body segments is difficult to inspect and may not be strong enough to function depending upon the pressures encountered. Use of a filler such as grout establishes undesirable temperature gradients between the liner and cast iron body segments due to the presence of the grout resulting in unnecessary and perhaps dangerous thermal stresses. Finally, the filler material, regardless of its initial strength, may fatique, crack and spall during operation, again resulting in an undesirable situation that is difficult to detect and to correct.

PRIOR ART STATEMENT

The following patents relate to, but do not disclose or teach, the claimed subject matter of the present invention.

U.S. Pat. No. 4,111,327 issued Sept. 5, 1978, to Janakiev discloses a pressure vessel for use as a reaction vessel which is built up from courses of flat arcuate segmental plates, the courses being located with respect to each other by means of pins or sleeves passing through aligned openings in the plates. No mention is made of a method of fitting together individual segments of the prestressed cast iron body and the liner prior to welding liner segments into a unitary piece.

U.S. Pat. No. 3,433,382 issued Mar. 18, 1969, to Boggio discloses a pressure vessel structure in which the outer support cylinder is formed of a plurality of discrete ring sectors with a sleeve positioned within the bore of the outer cylinder. Means are positioned between the support cylinder and the sleeve for producing hoop tension in the support cylinder and hoop compression in the sleeve. No mention is made of the particular method of fitting liner segments to body segments prior to welding the liner segments into a unitary piece.

U.S. Pat. No. 3,329,297 issued July 4, 1967, to Jordon discloses a pressure vessel particularly useful as a submarine hull constructed of sections of ceramic material formed in an arch-like construction to provide mutual support against external compressive forces. No mention is made of a fabrication method wherein individual liner segments are fitted to individual body segments and thereafter welded to form a one piece liner.

SUMMARY OF THE INVENTION

In view of the foregoing, it is a principal object of the present invention to provide an improved fabricating method for prestressed cast iron vessels.

It is an important object of the present invention to provide an improved method for fabricating large volume prestressed cast iron vessels having an internal liner in which individual liner segments are fitted to individual body segments and thereafter assembled as a ring with the liner segments being welded into a one piece ring prior to prestressing the assembled body segments.

Another object of the present invention is to provide a method of fabricating a prestressed cast iron vessel comprising: casting body segments; forming liner segments each complementary in shape to a selected one of the body segments; mounting each formed liner segment to the selected one of the body segments; forming a plurality of ring assemblies by assembling combined liner and body segments into a ring; welding the liner segments of each ring together forming a unitary liner ring; providing the outer surfaces of the cast iron body segments of each ring with tension members to complete each ring assembly; stacking ring assemblies to form the vessel; welding adjacent unitary liner rings together; providing a head to cover the top ring assembly to cover the vessel; and providing axially extending tendons to retain the head in place under pressure.

Another object of the present invention is to provide a method of fabricating a prestressed cast iron vessel of the type set forth in which the body segments are cast as double-walled arcuate segments, each having an inner wall and a spaced apart substantially parallel outer wall.

A further object of the present invention is to provide a method of fabricating a prestressed cast iron vessel of the type set forth wherein the cast body segments have radially extending webs between the inner and outer walls thereof defining a plurality of axially extending open chambers when constructed into a vessel to permit passage therethrough of the tendons.

A still further object of the present invention is to provide a method of the type set forth in which after the double-walled iron body segments are cast, the bottom surface and the two exposed radial side surfaces of each body segment are machined and after the body segments are assembled into a ring and the top surfaces, the outer surfaces of the outer wall thereof are smoothed and then keyways are provided across the junctures of adjacent body segments for insertion thereinto of keys to prevent radial movement of the segments relative to each other.

These and other objects of the present invention may more readily be understood when taken in conjunction with the following specification and drawings in which:

DESCRIPTION OF THE DRAWINGS

FIGS. 1a through 1d are perspective views of steps in constructing an individual ring assembly;

FIG. 2 is a perspective view partly broken away of two stacked ring assemblies;

FIG. 3 is a view in section partly broken away of a vessel particularly showing an axially extending tendon;

FIG. 4 is an enlarged perspective view of an individual cast iron body segment;

FIG. 5 is a view in section of a body segment with the associated liner segment particularly illustrating the means for mounting the liner segment to the body segment;

DESCRIPTION OF THE PREFERRED EMBODIMENT

Figure 6:
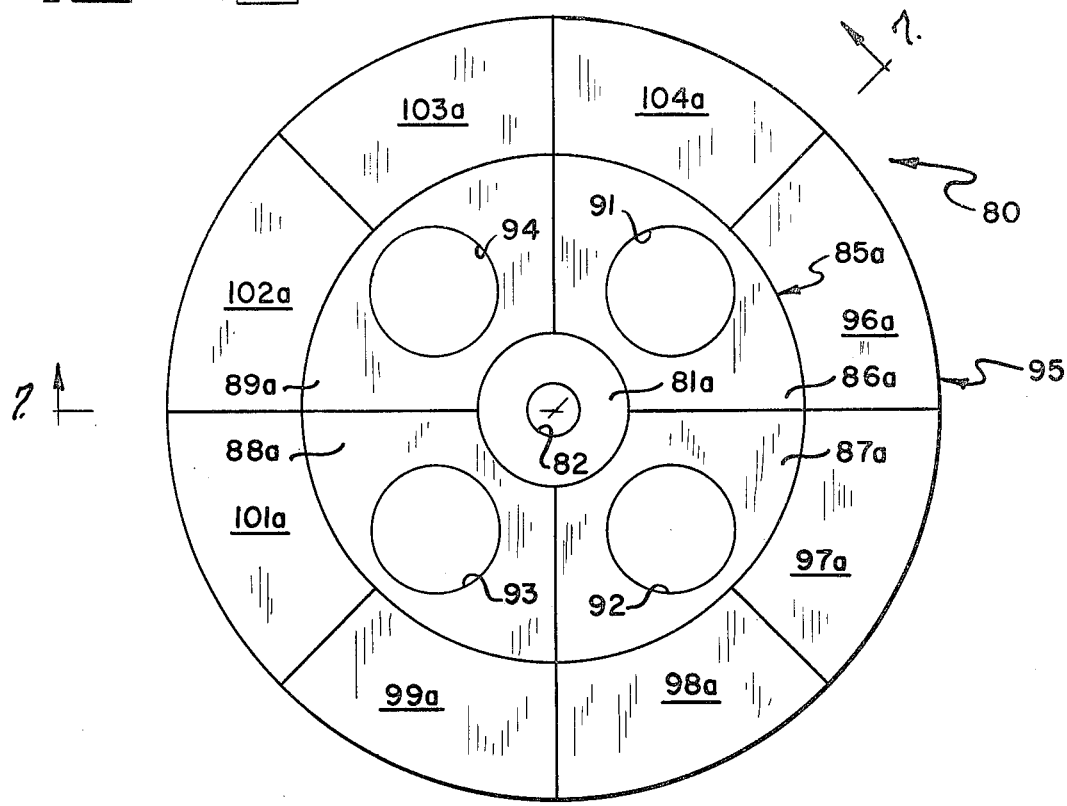
FIG. 6 is a top plan view of the top plate or head of the vessel, particularly illustrating the placement of the product nozzles and manway.
Figure 7:
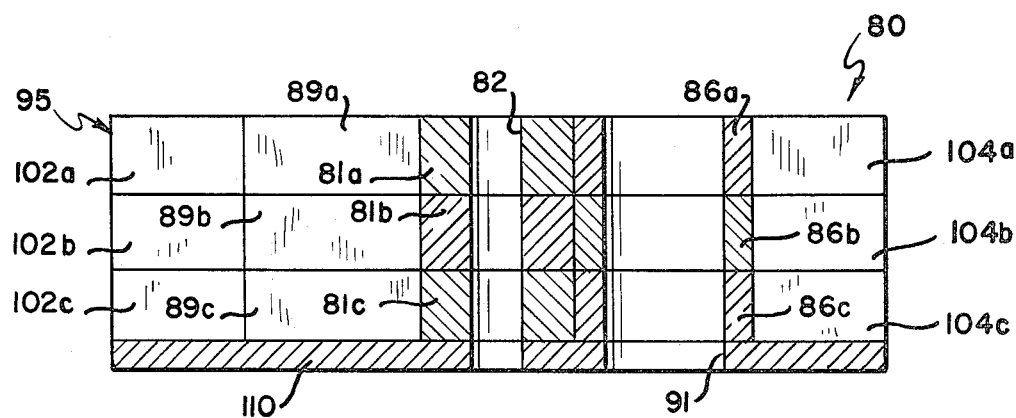
FIG. 7 is a view in section of the top plate or head illustrated in FIG. 6 as seen along lines 7—7 thereof.

The pressure vessel 150 (see FIG. 3) of the present invention is comprised of a plurality of ring assemblies 155 constructed from individual body segments 10 and liner segments 50, the body segments being prestressed by tension members 75 in the form of cables wrapped around the ring of body members. The individual ring assemblies 155 are stacked on top of a bottom assembly 120 and are closed by a top assembly 80, thereby to form the closed vessel 150. The method of the present invention is principally useful due to the present economic considerations in the construction of prestressed cast iron vessels with rathr large dimensions. Diameters in excess of 15 feet are at the minimum end of the economically feasible scale and heights may be in excess of 100 feet. Individual body segments 10 are cast with each body segment being as large as possible, for reasons hereinafter set forth.

For a cylindrical vessel 150, the body segments 10 are arcuate and may, as illustrated, subtend an arc of 45°, whereby eight such body segments make up a ring. Each body segment 10 has an outer wall 11 and a spaced apart substantially parallel inner wall 12, the two walls being connected at one end by a radially extending side wall 13 and at the other end by a radially extending side wall 14. The outer wall 11 has an outwardly facing exterior surface 16 and an inwardly or interior facing surface 17 and opposed top and bottom surfaces 18 and 19, respectively. Similarly, the wall 12 has opposed interior and exterior facing surfaces 21 and 22, respectively, and opposed top and bottom surfaces 23 and 24, respectively. The radially extending side wall 13 has opposed exterior and interior facing surfaces 26 and 27, respectively, as well as opposed top and bottom surfaces 28 and 29, respectively. Finally the radially extending side wall 14 has opposed exterior and interior facing surfaces 31 and 32, respectively, and opposed top and bottom surfaces 33 and 34, respectively. The body segment 10 is provided with a plurality of spaced apart radially extending webs 35 each having opposed flat side surfaces 36 and a top surface 37 and a bottom surface (not shown). The number of webs 35 as well as the thickness thereof is determined, as is the size and of the other walls making up the body segment, by the pressure within the vessel, the overall size thereof and other factors such as the material composition and strength.

The outer wall 11 of each body segment 10 is provided with four apertures 41 each located adjacent a respective corner, and aligned therewith are four apertures 42 extending through the inner wall 12. If possible, without undue expense, the apertures 41 and 42 are formed during the casting of the body segments 10, and counterbores 43 surround each of the apertures 42 in the interior facing surface 21 of the inner wall 12. A plurality of axially extending circumferentially spaced apart V-shaped grooves 44 are cast in the interiorly facing surface 21 of the inner wall 12, these grooves serving to conduct coolant axially between each body segment 10 and the adjacent liner segment 50. The periphery of the inwardly facing surface 21 of the inner wall 12 is bevelled as at 45 to facilitate welding attachment of the adjacent liner segment 50, as will be explained. Finally, keyways 46 are provided in adjacent or contiguous body segments 10 and keys 47 fit within the keyways, thereby to prevent radial movement of adjacent body segments. Keyways 46 preferably are not cast but machined at a later time during the inventive method, as will be explained.

Each liner segment 50, as shown, is arcuate and includes opposed interior and exterior facing surfaces 51 and 52, respectively. The circumferentially extending peripheral surfaces, in use, are denoted by the reference numeral 53 and the axially extending peripheral surfaces, in use, are denoted by the reference numeral 54. On the exterior facing surface 52 (see FIG. 5) of each liner segment 50 adjacent each corner thereof are four female fixtures 56 suitably mounted as by welding (not shown), each fixture having a threaded aperture 57 therein. The female fixtures 56 are so positioned to be in radial alignment with respective ones of the aligned apertures 41 and 42, in the exterior wall 11 and the interior wall 12, respectively. Each liner segment 50 is mounted to its respective body segment 10 by means of four bolts 60, each of which extends through the associated apertures 41 and 42, respectively, in the exterior wall 11 and the interior wall 12, and through and into the female fixture 56 on the exterior facing surface 52 of the liner segment 50. The bolt 60 has the head 62 positioned outside or exterior to the exterior wall 11 and the threaded end 61 is received in the threaded aperture 57 of the associated fixture 56. Adjacent liner segments 50 are connected by axially extending welds 65 (see FIG. 2) forming unitary liner rings and adjacent liner rings are connected by circumferentially extending girth welds 70.

Each ring of eight body segments 10 and eight mounted liner segments 50 is prestressed by tensioning members 75 in the form of circumferentially extending cable 75 wrapped around the ring; the cable is wrapped a predetermined number of layers and preferably extends substantially the axial length of each ring of body segments 10. A completed ring assembly 155 is composed of eight body segments 10 radially retained by keys 47 in keyways 46 having eight liner segments 50 welded axially into a unitary liner ring prestressed by cable 75 wrapped a predetermined number of layers. The number of layers of prestressed cable 75 used is determined, inter alia, by the vessel size, design pressure, cable diameter and strength, vessel construction and material strength.

The head assembly 80 and the bottom assembly 120 are similar in construction, but only the head assembly will be described in detail. The head assembly 80 is comprised of three layers, each being substantially identical in construction with the outermost or exterior facing layer being denoted by the reference numeral "a," the intermediate layer being denoted by the reference numeral "b" and the innermost layer being denoted by the reference numeral "c." There is a central disc 81 having a manway therein in the form of a cylindrical aperture 82. Radially outwardly of the central disc 81 is an annulus 85 comprised of four 90° arcuate segments 86, 87, 88 and 89 each of which respectively contains therein a cylindrical nozzle 91, 92, 93 and 94. Radially outwardly of the annulus 85 is a larger annulus 95 comprised of eight 45° arcuate segments, consecutively 96 to 99 and 101 to 104.

As illustrated, four product nozzles 91 to 94 extend through the annulus 85, this being particularly designed for a coal gasification vessel, but it is understood that other product exit means may be designed without departing from the scope of the present invention. Similarly, as illustrated, there are three layers of the head assembly 80, but it is understood that this may vary depending upon the height of the vessel and the total thickness of the head assembly, the amount and weight of prestressed cable 75 necessary. Where the vessel height is large such as 100 feet and the thickness of the head assembly 80 is extensive such as 8 feet so that each ring is of a significant weight by itself, three layers are convenient to install since the combined weight of the entire head assembly 80 may be too large for a single hoisting operation. Finally, a liner 110 is provided at the bottom of the head assembly 80 and is connected to the interior facing head segments in the same manner as previously described, the bolts and welds not being shown.

The bottom assembly 120 is similar in nature and design to the head assembly 80; however, the bottom assembly need not have the product nozzle 91 to 94 but merely have a central opening provided for either access to the vessel 150 or alternatively for removing bottoms produced during the reaction within the vessel. Additionally, there is provided, but not shown, fan or blower means where necessary to introduce the desired quantity of air or other reactant into the vessel 150.

Axially extending tendons 125 are positioned within each of the chambers defined by the webs 35 in each body segment 10, the ring assemblies 155 being aligned when layered or stacked such that the body segments 10 and particularly the webs 35 thereof are in registry thereby to provide axially extending chambers defined by the side walls 13 and 14 and the webs of each body segment. Each of the tendons 125 is connected to the bottom assembly 120 by means of connection means 126 and has tension adjusting means 127 exteriorly of the head assembly 80. In this manner, predetermined tension may be introduced to the tendons 125, again depending on the design pressure in the vessel, the type of material used and other factors well known in the art. Other structure such as reactant material introduction means in the form of nozzles extending through selected ones of the body segments 10 are provided and are well known in the art. Similarly, temperature gauge means, pressure gauge means and other appropriate sensors commonly used in the field may be provided, as desired.

Described hereinafter will be the method of the present invention specifically designed for fabrication of coal gasification reactor. The method of the present invention permits assembly of the vessel on site in an inherently safe manner which is price competitive with other methods and other materials, such as prestressed concrete or welded steel. For a coal gasification process in which pressures in the area of 1200 psig and temperatures in the neighborhood of 3000° F. are contemplated, the vessel 120, as shown, may have an outside diameter of about 29½ feed and an inside diameter of about 25 feet. The height of vessel 150 will be approximately 100 feet. Each individual body segment 10 will be cast iron having dimensions of about 26 inches in thickness or in radial dimension, 10 feet high or in axial dimension and 10 feet long or in circumferential extent.

The radially extending side walls 13 and 14 will be 4 inches thick as will be the outer and inner walls 11 and 12, respectively. Each of the webs 35 will be 3 inches thick and the webs will be placed such that 9 webs are cast per individual body segment thereby defining 10 chambers within each body segment 10 from the radial side wall 13 to radial side wall 14. Since there are eight body segments 10 per ring assembly 155, there are a total of 80 axially extending circumferentially spaced chambers defined by the webs 35 and the radially extending side walls 13 and 14. Circumferential alignment of the body segments 10 and the webs 35 ensure that 80 compartments extend axially of the vessel 150 and permit storage of the tendons 125 therein, each chamber accommodating two such tendons. Each of the tendons 125 may consist of, depending on the pressure generated within the vessel and the area of the head 80, 150¼ inch steel wires having a slight twist and defining a bundle having a diameter of about 6 inches. In one such design, 96 such tendons having an ultimate stress of 240,000 psi and an allowable stress of 168,000 psi were designed, the tendons being stressed in actual design to 156,000 psi. Factors determining the amount of prestress in the tendons 125 are the operating pressure in the vessel, the vessel diameter, the operating temperature which causes the vessel walls and the tendons to expand and various federal regulations. Although tension adjusting mechanism 127 is illustrated schematically, patented technology is available for such mechanism and processes to preselect a desired stress on tendons 125 in large vessels 150 of the type herein described. For a coal gasifier operating at the temperatures and pressure hereinbefore stated, the liner segments 50 are made from ⅞ to 1 inch thick steel plate, stainless steel being preferred which is sufficiently ductile for the stated purpose. The axially extending grooves 44, as illustrated, for a coal gasifier may be 1½ inches deep and positioned such that 20 grooves subtend the inside wall 12 of each body segment 10, the grooves serving to conduct cooling air axially along the exterior facing surfaces 52 of the liner segments 50.

The process of the present invention enables large scale vessels of the type described to be constructed on site, that is in the field with minimum effort while being economical, safe and ensuring good fit up between the liner segments 50 and the body segments 10. Specifically, each body segment 10 is cast and after casting the bottom surfaces, that is the bottom surface 19 of the outer wall 11, the bottom surface 24 of the inner wall 12 and the bottom surfaces 29 and 34 respectively of the side walls 13 and 14 as well as the bottom surfaces of each of the webs 35 are machined smooth. Thereafter, the outwardly facing surfaces 26 and 31 respectively of the side walls 13 and 14 are also machined smooth. The purpose of machining the bottom surfaces 19, 24, 29 and 34 of each segment 10 is to be certain that the segment is flat during fit up and the purpose of machining the side surfaces 26 and 31 of the side walls 13 and 14 is to ensure that adjacent body segments 10 fit closely one to the other to form a tight fitting ring. Thereafter, eight such body segments 10 are positioned on a vertical boring mill (not shown) and the remaining external surfaces, those being the exterior facing surfaces 16 of the eight body segments outer walls 11 are machined smooth. The purpose of machining these surfaces is to provide a flat smooth surface for the prestressing tension members or cable 75 against which to lay. As is understood, the cables 75 are under high tension and roughness in the support surface therefor is undesirable in that it may result in nicks or gouges in the cables resulting in possible weaknesses therein.

After the various surfaces have been smoothed and each set of eight body segments 10 has been formed into a ring and identified as to position in the ring, the keyways 46 are cut into adjacent body segments at the abutment of side wall 13 of one body segment and side wall 14 of the adjacent body segment. The body segments 10 are then separated, previously having been identified as to position in the ring, and an individual liner segment 50 is attached to each body segment.

As previously explained, each individual body segment 10 is provided with four apertures 42 countersunk as at 43 in the inner facing wall 12 with each of the apertures 42 being in registry with a corresponding aperture 41 in the external wall 11. At this time, the bolts 60 are introduced into the aligned apertures 41 and 42 and into the female fixtures 56 which have been suitably connected such as by welding to the exterior surface 52 of the individual or associated liner segment 50. Fit up between a specific body segment 10 and a specific liner segment 50 is assured since the segments are relatively small, compared to the overall vessel 150 size, and compared to the size of the entire liner, whereby variations in each body segment 10 may be accounted for in fitting each liner segment 50 thereto since the liner segments are relatively thin, such as 1 inch thick stainless steel. The liner segments 50 may be curved by means of a cold rolling process to ensure accurate fit up between each associated liner segment and body segment 10. The combined body segment 10 and liner segment 50 is then shipped to the plant site and there reassembled, since the body segments 10 were previously marked, into a ring. When formed on site, the keys 47 are inserted into the keyways 46 which had been machined previously during the initial assemblage of body segments 10 into the ring. The keys 47 are preferably slip fitted into the keyways 46 and do not necessarily need an interference fit to accomplish their intended purpose, which is to prevent a radial movement of the body segments 10 with respect to each other during welding of the liner segments 50 prior to prestressing.

Most importantly, after the combined body segments 10 and liner segments 50 have been assembled into a ring and the keys 47 inserted into the keyways 46, eight axial welds 65 are made to join the individual liner segments into a unitary liner ring. Only then, is the prestressing cable 75 wrapped around the thus formed ring to complete the ring assembly 155. The prestressing cable 75, in the case of the aforementioned coal gasification vessel 150 may be ⅝ diameter and seven such stacks or layers may be used for each ring assembly 155. A critical feature of the present process is wrapping the prestress cable 75 subsequent to the formation of the unitary liner ring to accommodate liner shrinkage during welding. Then the individual ring assemblies 155 are placed into position one on top of the other and the horizontal girth welds 70 are made to attach adjacent liner rings of adjacent ring assemblies 155 to each other.

The entire or unitary liner is thus constructed of small liner segments 50 each of relatively small thickness on the order of about one inch thick or less, whereby the welding need be done only from the inside of the liner. Backup strips (not shown) may be used if necessary to facilitate the welding. The cast iron body segments 10 have the inner edges thereof behind the weld joints bevelled as at 45 so as not to interfere with welding. Specifically, the bevelled edges 45 are provided to ensure that the cast iron or the body segments 10 immediately behind the welds 65 and 70 do not heat up and run into the weld joint itself thereby altering the chemical make up and perhaps weakening same. These ring assemblies 155 are placed or stacked one on top of the other until the desired height is attained, at which time the top assembly 80 is fabricated and positioned.

The head or top assembly 80 is constructed, for the pressure vessel 150 described herein, in three sections or layers, all as previously described. Three head or top assembly sections were selected due to the large height, over 100 feet, to which the segments must be hoisted and also in consideration of the substantial weight of each segment. The overall axial dimension of the completed or assembled head assembly 80 is approximately 8 feet and the outside diameter is approximately 30 feet. Preferably, the three central discs 81a-c are about 6 feet in diameter with the manway 82 being on the order of about 2 feet in diameter. Radially outwardly of the discs 81a-c are the annuli 85a-c, each constructed of four 90° arcuate cast iron segments 86a-c through 89a-c. The radial extent of each annuli 85a-c is about 8½ feet and each of the product nozzles 91 to 94 is about 6 feet in diameter. Outwardly of each of the annuli 85a-c is a corresponding annuli 95a-c these being comprised of eight body segments 96-99a-c and 101-104a-c, each segment subtending a 45° arc and each segment being cast in the manner described with respect to the body segments 10.

Construction of each annulus 85c and 95c is in the manner heretofore described with respect to the construction of the ring assemblies 155 of the body segments 10 and the associated liner segments 50. That is to say, that the four arcuate segments 86c-89c are machined, assembled and then the keyway slots are provided. Thereafter the segments 86c-89c are disassembled and the appropriate liner segments are fitted thereto and mounted as heretofore explained. Thereafter the combination of the annulus segments 86c-89c having the liner segments appropriately mounted thereto are reassembled and finally machined. Then the segments 86c to 89c with the attached liner segments are disassembled shipped to site and thereafter reassembled with the annulus 95c made up of the segments 96c to 99c and 91c to 94c. These segments at the factory were assembled as previously discussed having the appropriate liner segments connected thereto and machined as heretofore described.

On site, each ring of the head assembly 80 is assembled and appropriately wrapped with tension members (not shown) and thereafter hoisted in place. Since the annulus segments 86c to 89c to 99c to 101c to 104c have the liner segments 110 bolted thereto, the corresponding segments in annulus 85b and 95b must have machined therein a sufficient countersink to accommodate the bolt head (not shown) which extends beyond the exterior facing surface of the c segments. The principal difference between construction of the head assembly 80 and the remainder of the vessel 150 is that only the c segments of the annulus 85 and the annulus 95 have liner segments attached thereto. Only the central disc 81c has liner segments connected and if necessary the interior walls of the manway 82 may be provided with liner protection, all in the manner aforesaid.

In this manner, the head assembly 80 is constructed according to the method previously set forth herein, hoisted in place and thereafter assembled to provide a head assembly having an axial dimension of approximately 8 feet and providing the snug or good fit-up between the associated liner and body segments. In this manner all the advantages of the method heretofore described are preserved and maintained in constructing the head assembly 80.

The bottom assembly 120 is constructed in a manner similar to the head assembly 80; however, the problems of hoisting are not present but the problems of snug fit for the liner (not shown) remain. To this end, the construction of individual body segments and liner segments is retained as previously described to ensure that a good fit is obtained between each individual liner segment and the prestress members in the form of cables are not applied until after the liner has been welded into a unitary construction. As may be seen therefore, the only welds made subsequent to the application of the prestress cables are the welds between the junctures of the top and bottom liners and the axially extending liner and the girth welds 70.

In all other respects, weld shrinkage is accommodated by wrapping subsequent to welding. The horizontal girth welds 70 made subsequent to wrapping do not pose a problem of the same magnitude as the axial welds 65 because the shrinkage is in an axial direction as opposed to a radial direction with the axial welds. For this reason, the girth welds 70 do not pose the problem that the axial welds 65 pose and for this reason the weld of the girth welds subsequent to wrapping is not delirious to the liner integrity.

While the present method has been described in conjunction with a large pressure vessel for a coal gasification system wherein the vessel 150 has an exceedingly large outside diameter of about 30 feet and an inside diameter of about 25 feet and a length in the order of 100 feet, it is apparent that the present inventive method is applicable to prestressed cast iron vessels of any dimension, economics being the principal determinant of whether prestressed cast iron is a valuable construction material. Of necessity, certain portions of the coal gasification apparatus such as blowers, inlet nozzles, parameter testing devices and the like have been omitted from the description for the sake of economy and brevity, since these components form no part of the invention herein, it is not necessary to describe them in detail.

While there has been described what a present is considered to be the preferred embodiment of the present invention it will be apparent to those skilled in the art that various modifications and alterations may be made therein without departing from the true spirit and scope of the present invention, and it is intended to cover in the claims appended hereto all such modifications and alterations.

The embodiment of the invention in which an exclusive property of privilege is claimed are defined as follows:

1. A method of fabricating a prestressed cast iron vessel comprising: casting body segments; forming liner segments each complementary in shape to a selected one of the body segments; mounting each formed liner segment to the selected one of the body segments; forming a plurality of ring assemblies by assembling combined liner and body segments into a ring; welding the liner segments of each ring together forming a unitary liner ring; providing the outer surface of the cast iron body segments of each ring with tensioned members to compress and complete each ring assembly; stacking ring assemblies to form the vessel; welding adjacent unitary liner rings together; providing a head to cover the top ring assembly to cover the vessel; and providing axially extending tendons under tension to retain the head in place under pressure.

2. The method of fabricating a prestressed cast iron vessel set forth in claim 1, wherein said body segments are double walled.

3. The method of fabricating a prestressed cast iron vessel set forth in claim 1, wherein said liner is rolled steel.

4. The method of fabricating a prestressed cast iron vessel set forth in claim 1, wherein female fixtures are provided on the exterior facing surface of each liner segment and threaded bolts extending through said body segments are provided to mount said liner segments to said body segments.

5. The method of fabricating a prestressed cast iron vessel set forth in claim 1, wherein said head is cast iron and a cast bottom is provided.

6. A method of fabricating a prestressed cast iron vessel comprising: casting double wall arcuate body segments each having an inner wall and a spaced apart substantially parallel outer wall; forming liner segments each complementary in shape to the inner wall of a selected one of the body segments; mounting each formed liner segment to the selected one of the body segments; forming a plurality of ring assemblies by assembling combined liner and body segments into a ring; welding the liner segments of each ring together forming a unitary liner ring; providing the outer surfaces of the cast iron body segments of each ring with tensioned members to compress and complete each ring assembly; stacking ring assemblies to form the vessel; welding adjacent unitary liner rings together; providing a head for the top ring assembly to cover the vessel; and providing axially extending tendons under tension to retain the head in place under pressure.

7. The method of fabricating a prestressed cast iron vessel set forth in claim 6, wherein the double wall body segments subtend an angle of 45°.

8. The method of fabricating a prestressed cast iron vessel set forth in claim 6, wherein radially extending webs are cast between the inner and outer walls of each segment defining a plurality of axially extending open chambers in each segment.

9. The method of fabricating a prestressed cast iron vessel set forth in claim 6, wherein the liner is steel and is rolled to provide the complementary shape.

10. The method of fabricating a prestressed cast iron vessel set forth in claim 6, and further comprising bevelling the edges of the inner wall of each body segment to facilitate welding the associated liner segment.

11. The method of fabricating a prestressed cast iron vessel set forth in claim 6, wherein said tension members are cables wrapped around the outside surfaces of the body segments in each ring.

12. The method of fabricating prestressed cast iron vessel set forth in claim 11, wherein said tension members are wrapped subsequent to welding the liner segments into a unitary liner ring to accommodate liner shrinkage during welding and to ensure good fit-up between the associated unitary liner ring and body segments.

13. The method of fabricating a prestressed cast iron vessel set forth in claim 6, wherein said tendons are a plurality of axially extending cables connecting the head and a provided bottom.

14. The method of fabricating a prestressed cast iron vessel set forth in claim 6, wherein said head is circular in plan view and comprised of a plurality of axially stacked layers.

15. The method of fabricating a prestressed cast iron vessel set forth in claim 14, wherein said head includes a central disc abutted by four double wall arcuate body segments each subtending an angle of 90° abutted by eight double wall arcuate body segments each subtending an angle of 45°.

16. A method of fabricating a prestressed cast iron vessel comprising: casting double wall iron body segments each having an arcuate inner wall and a spaced apart substantially parallel outer wall with a plurality of radially extending webs interconnecting the inner wall and the outer wall; smoothing the bottom surface and the two exposed radial side surfaces of each body segment; assembling body segments into a ring and smoothing the top surfaces and outer surfaces of the outer walls thereof; providing keyways across the juncture of adjacent end walls of the body segments; forming liner segments each complementary in shape to the inner wall of a selected one of the body segments; mounting each formed liner segment to the selected one of the body segments; forming a plurality of ring assemblies by assembling combined liner and body segments into rings; welding the liner segments of each ring together to form unitary liner rings; thereafter wrapping the outer surfaces of the cast iron body segments of each ring with tensioned members to compress and complete the ring assemblies; stacking ring assemblies to form the vessel with the bottommost ring assembly on a bottom head; welding adjacent unitary liner rings together; providing a top head to cover the top ring assembly to close the vessel; and providing axially extending tendons to retain the top and bottom heads in place under pressure.

17. The method of fabricating a prestressed cast iron vessel set forth in claim 16, and further comprising providing aligned apertures in the inner and outer walls of each body segment and a counterbore in the interior surface of the inner wall of each body segment around each aperture, and female fixtures on the exterior facing surface of each liner segment for receiving a bolt extending through a pair of the aligned apertures, the female fixture fitting within the counterbore.

18. The method of fabricating a prestressed cast iron vessel set forth in claim 16, and further comprising providing axially extending grooves in the interior surface of the inner wall of each body segment, the ring assemblies being positioned so that the grooves are in registry and provide axially extending passageways in the interior surface of said inner wall for the passage of a coolant therethrough.

19. The method of fabricating a prestressed cast iron vessel set forth in claim 16, wherein keys for said keyways are fitted into said keyways prior to welding the liner segments of each ring assembly together to form the unitary liner rings thereby preventing radial movement of the body segments.

20. The method of fabricating a prestressed cast iron vessel set forth in claim 16, wherein each ring assembly is aligned so that the webs are in registry forming axially extending chambers therebetween with said axially extending tendons passing through said chambers.

* * * * *